United States Patent [19]

Owston

[11] 3,970,709

[45] July 20, 1976

[54] ADHESIVE FORMULATIONS FOR BONDED METAL ASSEMBLIES WITH RESISTANCE TO AGGRESSIVE ENVIRONMENTS

[75] Inventor: William J. Owston, Edinboro, Pa.

[73] Assignee: Lord Corporation, Erie, Pa.

[22] Filed: Dec. 11, 1974

[21] Appl. No.: 531,654

Related U.S. Application Data

[63] Continuation of Ser. No. 298,352, Oct. 17, 1972, abandoned.

[52] U.S. Cl. .............................. 260/827; 156/329; 260/46.5 UA; 260/865; 260/861; 260/873
[51] Int. Cl.$^2$ ......................................... C08L 83/06
[58] Field of Search ................ 260/827, 46.5 UA

[56] References Cited
UNITED STATES PATENTS 2,962,471  11/1969  Lang et al. .......................... 260/827

Primary Examiner—Wilbert J. Briggs, Sr.
Attorney, Agent, or Firm—John A. Gazewood

[57] ABSTRACT

New adhesive compositions are described which are capable of providing bonded assemblies at least one element of which is a metal and which are extremely resistant to deleterious environments, particularly atmospheric moisture and liquid water. The compositions include: (A) about 75 to 99% of any known adhesive compositions based on a polymerizable liquid resin containing a compound having a terminal vinyl group, (B) about 0.5 to about 15%, by weight, of ethylenically unsaturated carboxylic acid and (C) about 0.5 to about 10%, by weight, of an organosilicon compound represented by the formula $X_3Si(CH_2)_m Y$ in which $m$ is an integer from 0 to 3, $Y$ is an organofunctional group and $X$ is a hydrolyzable group.

10 Claims, 4 Drawing Figures

ADHESIVE FORMULATIONS FOR BONDED METAL ASSEMBLIES WITH RESISTANCE TO AGGRESSIVE ENVIRONMENTS

RELATED APPLICATIONS

This Application is a continuation of Owston U.S. patent application Ser. No. 298,352, filed Oct. 17, 1972, now abandoned.

BACKGROUND OF THE INVENTION

The present invention relates to new and improved adhesive compositions capable of providing bonded assemblies which are extremely resistant to severe environments. The bonds are especially durable where wet conditions or moist atmospheres prevail. More specifically, it relates to improved adhesively bonded assemblies in which at least one of the surfaces is a metal.

The use of adhesives to bond metal assemblies is a widespread and well-known fabrication process. Many adhesive compositions are known which are prepared from polymerizable substances. Certain previously known compositions, having adhesive properties, have been prepared from polymerizable vinyl compounds, having a terminal $>C=CH_2$ group. These adhesives are usually mixtures of 100 percent solids content; all of the adhesive being polymerized. When certain redox systems are used as catalysts, a complete polymerization can be effected by mild heating or even at room temperature. Adhesives of this type have been found well suited for joining many similar and dissimilar materials, including metals, at room temperature.

However, many desirable uses have been precluded by the tendency of the metallic surfaces to corrode, especially after the joint is formed. Corrosive oxidation usually begins in the exposed areas outside of, but adjacent to the bond area. Such moisture-catalyzed corrosion tends to spread under the adhesive bond and cause the adhesive-to-metal interface to deteriorate. Even the limited moisture normally found condensed on metallic surfaces has been found to cause corrosion after becoming enclosed between the adhesive and the metal.

Many attempts have been made to protect the metal joint from environmental attack, especially with the use of primers and surface treatments prior to bonding, or protective coatings after the bonded assembly is formed. The need for a protective primer requires an additional operation in the manufacturing process, seriously raising the costs of producing the assembly. In addition, the priming requirement becomes an impossible step in high speed or mass produced assemblies and processes, since a baking, drying or layover curing time must be observed for the primer. The best primers, even when the manufacturing conditions permit their use, eventually deteriorate, permitting corrosive attack. In order to be used in most engineering designs, the bond must have long term stability, be reliable, and even permanent in many cases. If an adhesive joint could be made as permanent as mechanical fasteners or welding, the benefits of structurally bonding an assembly could be applied to many new uses. Inasmuch as the need for prior treatments and primers would be eliminated, this procedure would be a useful and practical method, in contrast to the impractical prior art bonding processes and adhesives.

THE PRIOR ART

Organic carboxylic acids are known to be useful as adhesion promoting agents on polar surfaces, including metals. U.S. Pat. No. 3,016,309 is typical of the prior art in which an unsaturated organic acid is incorporated as part of a copolymer to provide acidic functionality. The resulting acid functional copolymer is then added to an organic coating to increase its adhesion to metals. U.S. Pat. Nos. 3,333,025 and 2,981,650 disclose polymerizable adhesives in which the organic acid is included as a free monomer, or optionally, as part of a copolymer, in an adhesive composition. Common to all prior art compositions containing unsaturated organic acids are the very low concentration levels of acid functionality that are used. As the concentration of the acid material is increased the primary adhesion is also improved. However, corrosive attack on the metal increases even more rapidly due to acid catalysis, thus limiting prior art compositions to low concentrations of acid. The use of organic acids in coatings or adhesives over unprotected or unprimed metals, steel and aluminum especially, results in high initial adhesion, but is followed by a rapid decline in the adhesion during severe environmental exposure. The corrosion occurring at the surface between an acid containing adhesive and metals is heightened by any amount of acid functionality, as evidenced by the recommendation of the use of primers and the low acceptable limits of the incorporated acids characteristic of the various prior art descriptions. The prior art essentially discloses the advantages of using organic acids, although at necessarily low levels, but ignores the practical consequences of the corrosive disadvantages and process requirements such as primers or treatments for even these low levels of use. Because of these well-recognized drawbacks, unsaturated organic acids have not been found useful in practical applications in the metal engineering and fabricating arts.

Silanes have also been reported in the prior art as adhesion improving agents, especially in the case where an organic resin is in contact with an inorganic material such as a mineral or glass. Wide usage of these materials occurs in the sizing of reinforcing glass fibers for shaped plastic articles and particulate fillers in plastics and elastomers. The organosilicone is described as capable of forming an inorganic-organic chemical bridge across heterogeneous interfaces, U.S. Pat. No. 3,328,339 discloses a silane-treated mineral filler for plastics, to improve filler compatibility and cohesive strengths of the composition. The use of silanes as a priming agent, however, introduces the previously mentioned drawbacks of primers and their application processes. Further, with the present class of unsaturated adhesives, treatment of the metal surface with a silane priming agent fails to yield improvements over its absence in the bonded composite.

It should be apparent in view of the foregoing that while polymerizable adhesives exist which are useful for forming bonds between one metal and another metal or various other materials, that a need exists in the art for adhesives for this purpose which are capable of forming moisture-resistant bonds without the use of an undercoating, and which do not increase the tendency of the bonded metal to corrode.

It is an object of the present invention therefore to provide novel adhesive compositions capable of providing adhesive bonds between a metal and another metal or other materials which are resistant to atmospheric moisture and water.

It is another object of the invention to provide adhesive compositions for bonding metal which do not increase the tendency of the metal to corrode.

It is yet another object of the invention to provide novel adhesive compositions based on known adhesives comprising polymerizable compounds having terminal vinyl groups, to which an unsaturated carboxylic acid has been added as an adhesion promoter but which nevertheless do not increase the tendency of a bonded metal to corrode.

It is still another object of the invention to provide compositions capable of providing metal-to-metal bonds or bonds between metals and nonmetallic materials, which are so stable, reliable and durable, even under adverse conditions of use such as a moist or wet environment, that they can be used in place of mechanical fastening means.

BRIEF DESCRIPTION OF THE INVENTION

The foregoing and other objects of the invention are obtained by modifying a conventional polymerizable adhesive of the type based on liquid monomers of compounds containing a terminal $>C=CH_2$ group, by the inclusion of an ethylenically unsaturated carboxylic acid to improve the adhesion of the composition and an organosilicon compound. More specifically, the new adhesives are polymerizable mixtures containing (A) about 75 to about 99% of a polymerizable liquid adhesive containing at least one liquid compound having a terminal vinyl group, (B) about 0.5 to about 15% of the ethylenically unsaturated carboxylic acid, and (C) about 0.5 to about 10% of an organosilicon compound represented by the formula $X_3Si(CH_2)_m Y$ in which $m$ is an integer from 0 to 3, Y is an organo functional group and X is a hydrolyzable group. Component A contains about 10 to about 90% by weight of the polymerizable liquid compound containing the terminal vinyl group.

Preferably, redox systems are employed as curing catalysts for the compositions according to this invention. Redox systems which contain a peroxide, for example, an organic peroxide, as the oxidizing component and tertiary amines or active metals as the reducing component, have been found particularly well suited.

The present invention provides an adhesive composition which not only allows the use of organic acids without the drawbacks of subsequent corrosion, but which also permits the use of much higher concentrations, heretofore found extremely destructive in the prior art. Further, deterioration due to environmental exposure is completely overcome, permitting reliable joints to be engineered, using organic acid adhesion promoters safely for the first time in practical operations.

The use of silanes and unsaturated organic acids such as acrylic or methacrylic acid together in a polymerizable adhesive comprised primarily of unsaturated compounds provides novel benefits previously undisclosed. Further, these benefits are distinct from those obtained from the separate use of unsaturated organic acids and silanes in the resins of the prior art.

In the presence of both the selected acids and silanes of the present invention, improvements are obtained in the environmental resistance of the adhesive which are unexpected and unusual when the performance of each class of compounds are evaluated. The novel performance, or synergy, is particularly unexpected in view of the prior art performance of the separate compounds. The bulk added silcane was found to exhibit no improvement in the environmental resistance when present alone. The use of the unsaturated acids yielded much improved initial adhesion strengths only when a silane compound was also present, in addition to maintaining the strengths during severe environmental exposures. The prior art and observed results of comparable levels of acids, or even much lower concentration levels, yield severe corrosion on metal substrates, in contrast to the total lack of under bond corrosion obtained in the practice of the present invention.

The adhesive compositions prepared according to the present invention are unusually stable during subsequent storage, even when subjected to wide variances in temperature and conditions. Such storage stability allows the compositions to be used after long storage, permitting practical, widespread use, remote from a manufacturing facility and free from the need for frequent preparation of small batches to replace unstable adhesives.

DETAILED DESCRIPTION OF THE INVENTION

In the present invention, the base adhesive resin or component (A) comprises a polymerizable mixture of at least one liquid, unsaturated compound, preferably in combination with a polymeric compound, which is polymerizable with the aid of a catalyst system, preferably a redox system, to which (B) an organic acidic compound, preferably unsaturated organic monomers, and (C) an organosilicon compound, preferably a hydrolyzed or hydrolyzable organosilicon or silane, admixed in suitable proportions. The respective components are (A) an unsaturated polymerizable adhesive resin, present from about 75 to 99 parts, (B) an unsaturated carboxylic acid, found most advantageous in concentrations below 14 percent, and preferably below 10 percent; for example, between 0.5 to 8.0% and (C) an organosilicon, found advantageous in levels below 10 percent by weight of the total composition. The presence of both (B) and (C) is a prime requisite. Only when both are present is it possible to obtain the unusual and maximum adhesion.

The adhesive base resin, component (A), comprises a polymerizable mixture containing at least about 10% to about 90% of a liquid unsaturated compound containing at least one terminal vinyl group, preferably in combination with a polymeric compound; the resin being polymerizable with the aid of a catalyst system, preferably a redox system. Preferably, redox systems are employed as curing catalysts for the compositions according to the invention. Redox systems which contain a peroxide, for example, an organic peroxide, as the oxidizing component, and organic sulfur compounds, or tertiary amines or active metal salts as the reducing component, have been found particularly well suited for use in the present invention. Such redox systems are abundantly described in the literature.

Polymerizable liquid monomeric compounds containing a terminal $>C=CH_2$ group which are excellently suited for the adhesives employed according to the invention, for example, are styrene, vinyl toluene, lower alkyl esters of acrylic acid or methacrylic acid. Preferably, mixtures of such monomers with polymers of compounds containing a terminal $>C=CH_2$ group are employed, e.g., polystyrene, polymethylmethacrylate and the like. Both saturated and unsaturated polymers, such as polyesters, known in the art per se, have been found to be useful in conjunction with the vinyl compounds of component (A).

Other conventional compounds and additives commonly incorporated in the base adhesive resins, component (A), in the prior art may also be used in the compositions of the present invention. Small quantities of stabilizers such as compounds containing active hydrogens, for example, hydroquinone, may be used to provide improved shelf life. In addition, the compositions may contain other known additives such as fillers such as oxides, pigments, coloring agents, paraffinic substrances and cross-linking agents.

While any suitable unsaturated carboxylic acid may be employed as component (B), it is generally preferred to use methacrylic acid or acrylic acid.

Component (C) of the compositions of the present invention, the organosilicon compounds, are commonly referred in the art as silanes. These compounds, as noted above, may be represented by the formula $X_3Si(CH_2)_mY$ in which $m$ is an integer which is 0 to 3 in commonly available silanes. However, inasmuch as the length of the methylene chain does not appear to affect the performance of the adhesive compositions, $m$ in the formula can have a value larger than 3.

The hydrolyzable groups X are most commonly alkoxy groups such as methoxy or ethoxy groups, but may be higher alkoxy groups or any other suitable hydrolyzable groups. The identity of the hydrolyzable groups is of secondary importance since it has been found that hydrolyzed or partially hydrolyzed silanes are operative. Trace amounts of moisture present in the adhesive composition cause partial or complete hydrolysis of the silane, which is often evidenced by the formation of a white compound thought to be a hydrolyzed silane or polysiloxane.

The presence of the organic group Y in the organosilicon compound is of critical importance to obtain solubility and compatibility with the organic adhesive resin. The lack of an organic group can cause decreased solubility during hardening of the organic resin, producing a distinct discontinuous boundary layer between the organic and silicon components. Such a boundary layer can present a phase interface, weakening the resin and bond intersurface. The organic group is preferably an alkyl, alkenyl or aromatic group which is chemically reactive with organic resins or additives contained in the basic adhesive. Preferred reactive groups are alkenyl groups such as acryl, methacryl or vinyl groups. Other reactive groups found useful in providing the organically reactive or hydrogen bonding sites are hydroxyl, cyano, amino, glycidyl, and the like groups.

It has been found that alkyl or aromatic groups such as methyl or phenyl groups provide sufficient means of introducing the necessary solubility and compatibility to the organosilicon compound which is incorporated into the shelf-storable liquid adhesives. These organic groups meet the minimal criteria of providing adequate physical anchoring and phase continuity within the cured adhesive resin and at the interface with the bonded substrate.

The invention will now be illustrated in greater detail in conjunction with the following specific examples thereof.

ADHESIVE RESIN R-1

A base adhesive useful as component A of the compositions of the present invention was prepared according to the procedure of Example 3 of U.S. Pat. 3,333,025.

Three parts, by weight, of polychloroprene (Neoprene WRT) are dissolved in 63 parts of methylmethacrylate monomer and 34 parts of styrene monomer. The mixture is heated to 80° C after which 0.01% of azobisisobutyronitrile is added and the material partially polymerizes to a viscosity of about 15,000 cps at 72° F, to form the prepolymer A.

The following additional components were admixed with prepolymer A:

|  | Parts |
|---|---|
| An unsaturated polyester resin (R) (a resin obtained from about equal parts maleic-fumaric acid and 1,2-propylene glycol as a 60% solution in monostyrene) | 2.0 |
| Polyester resin (P) (75% solution of an unsaturated polyester in methyl methacrylate, viscosity 3000–4000 cp, acid number 38) | 1.0 |
| Diisopropylol-p-toluidine | 0.5 |
| Paraffin | 0.2 |
| Hydroquinone | 0.02 |

ADHESIVE RESIN R-2

A mixture of the following composition was prepared by mechanical agitation:

|  | Percent |
|---|---|
| Glycol dimethacrylate | 6.67 |
| Methyl methacrylate | 51.0 |
| Butyl methacrylate | 10.0 |
| Neoprene | 2.95 |
| Unsaturated polyester resin, (prepared by the reaction of propylene glycol, phthalic acid, and maleic anhydride in a molar proportion of 3.1:1:2, to yield a low acid number, unsaturated polyester) | 1.0 |
| Polystyrene | 33.0 |
| Cab-O-Sil H-5 | 0.67 |
| Paraffin | 0.201 |
| Di-isopropylol-p-toluidine | 0.536 |
| Hydroquinone | 0.0053 |

Just before use, the adhesive resins prepared according to the present invention were catalyzed by mixing with 3 percent of a hardening paste composed of 55% benzoyl peroxide dispersed in butyl benzyl phthalate, and employed to bond the overlap shear test assemblies noted in the examples.

Base adhesive resins R-1 and R-2, prepared as described above, were employed as component (A) to form adhesive compositions of the present invention as set forth in Tables I, II, III and IV, below. The adhesive compositions were prepared by thorough mechanical agitation of components (A), (B) and (C); and catalyzed as described above.

The data of Tables I, II, III and IV are illustrated graphically in part in the accompanying drawings in which.

TABLE I

Figure 1:
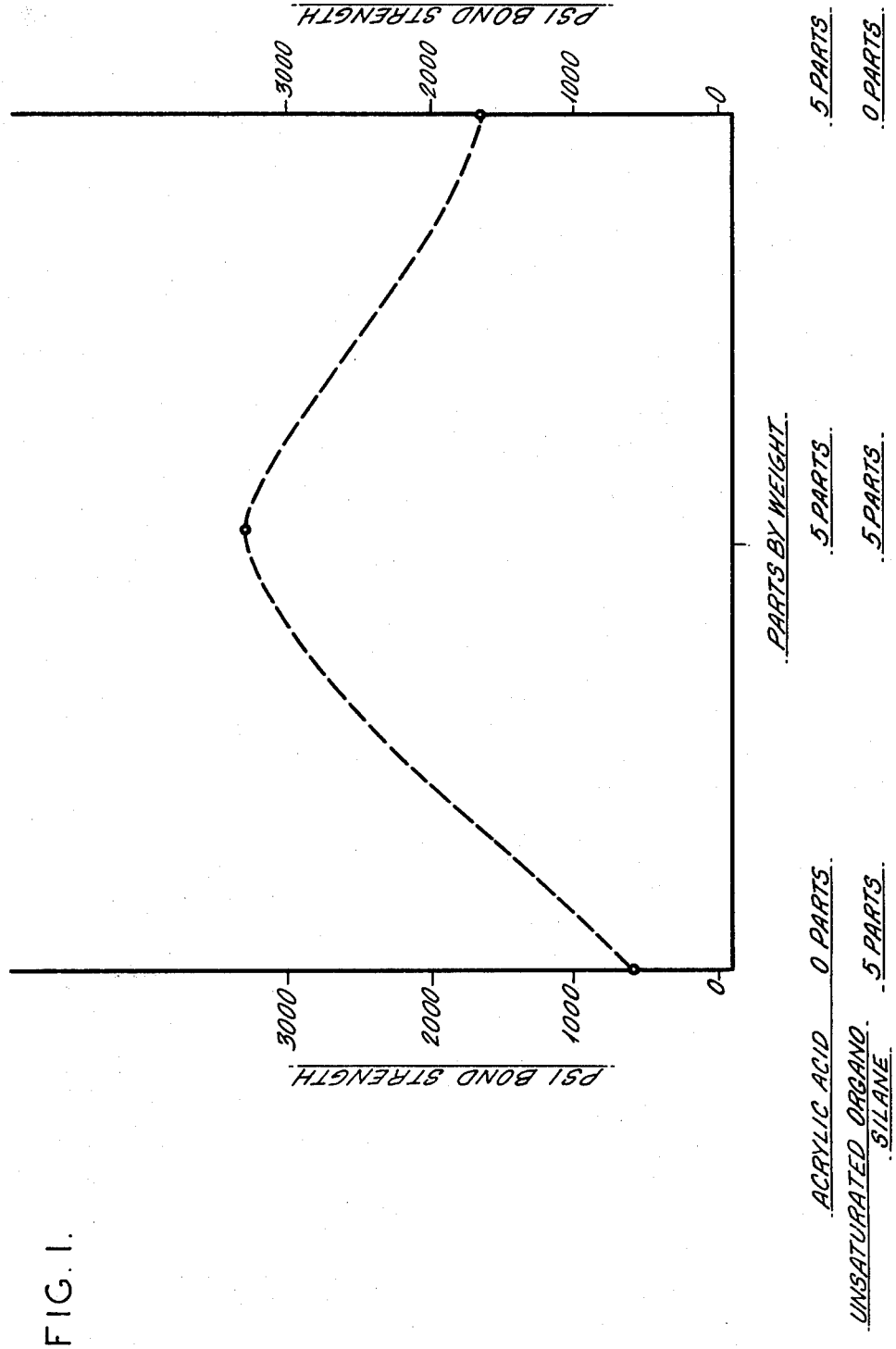
FIG. 1 is a plot of a curve showing the variation of bond strength to aluminum of adhesives employing various proportions of acrylic acid and unsaturated organo silane in compositions of the invention.
Figure 2:
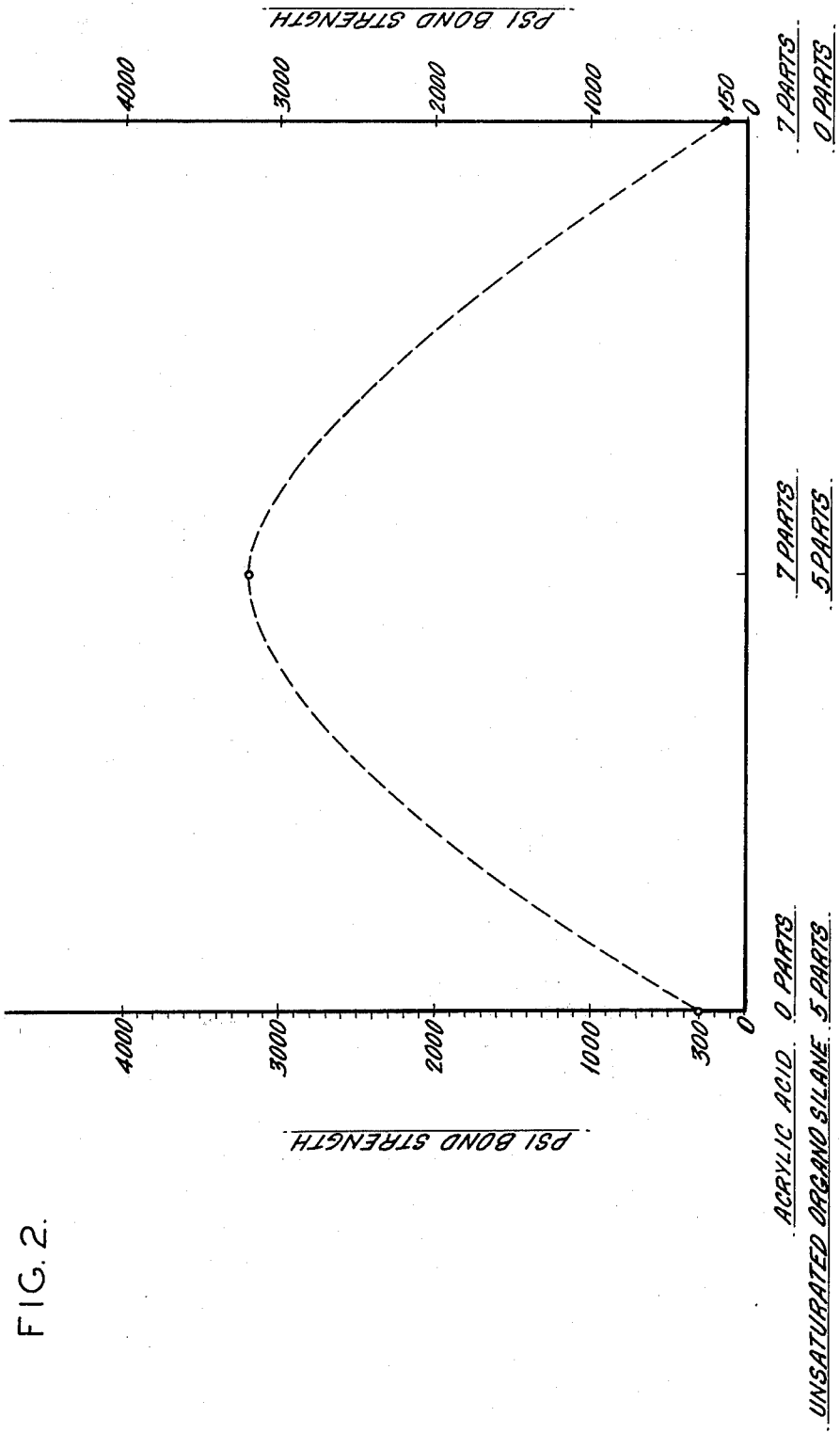
FIG. 2 is a plot of a curve showing the variation of bond strength to steel of adhesives employing various proportions of acrylic acid and unsaturated organo silane in compositions of the invention.
Figure 3:
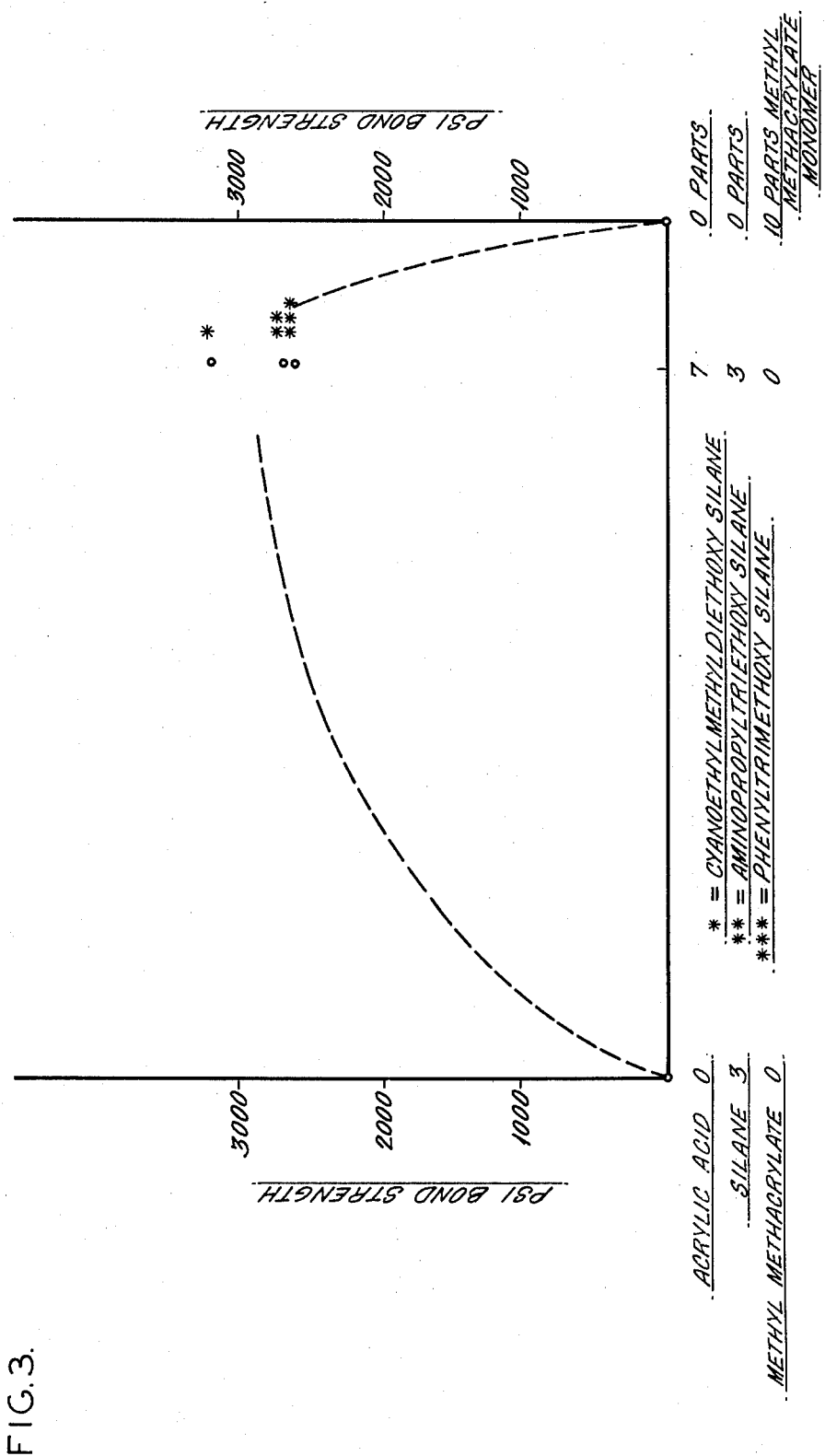
FIG. 3 is a plot of a curve illustrating the performance of adhesive compositions of the invention containing various other silanes and acrylic acid.
Figure 4:
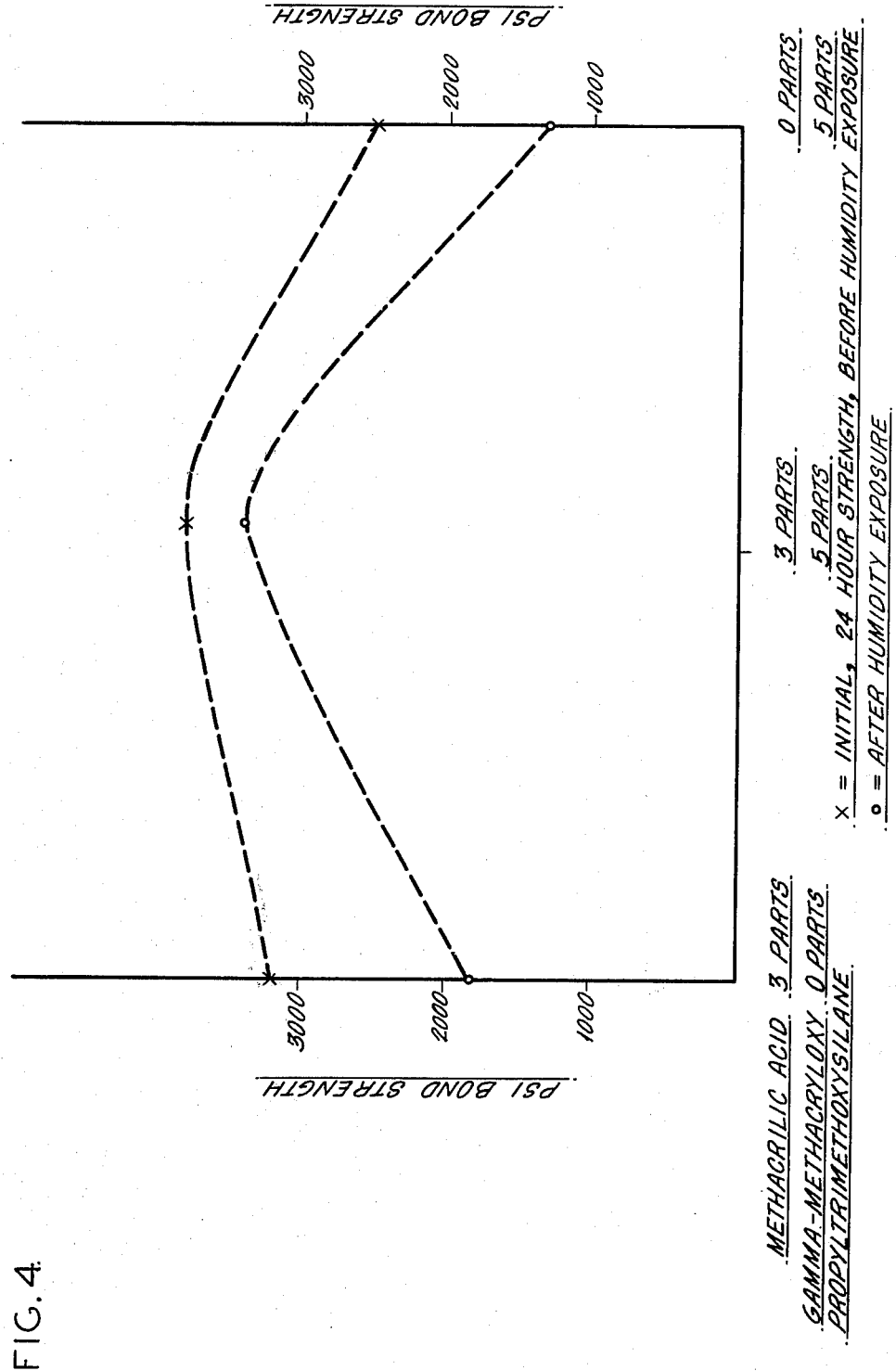
FIG. 4 is a plot of a curve illustrating the bond strength on steel of adhesive compositions of the invention from Table IV before and after exposure to moisture.

|  | 1 | 2 | 3 | 4 | 5 |
|---|---|---|---|---|---|
| Adhesive resin R-1 | 100 | 100 | 100 | 100 | 100 |
| Unsaturated ester monomer, methyl ester of methacrylic acid | 10 | — | — | — | 5 |
| Acrylic acid | — | 5 | — | 5 | — |
| gamma-Methacryloxypropyl-trimethoxy silane | — | — | 5 | 5 | — |
| 24 hour bond strengths, 2024T3 alclad aluminum, untreated, solvent wiped | 1450 | 2500 | 1520 | 3400 | 1700 |
| 10 days, 120°F, 100% relative humidity, psi | 450 | 1500 | 550 | 3320 | 520 |

TABLE II

|  | 1 | 2 | 3 | 4 | 5 | 6 | 7 | 8 |
|---|---|---|---|---|---|---|---|---|
| Adhesive resin R-1 | 100 | 100 | 100 | 100 | 100 | 100 | 100 | 100 |
| Acrylic acid | 5 | 7 | — | 7 | 7 | 8 | 5 | — |
| gamma-Methacryloxypropyl-trimethoxysilane | — | — | 5 | 2 | 5 | 8 | 8 | — |
| 24 hour bond strengths, solvent wiped, type SAE 1010, untreated cold rolled steel | 2600 | 2100 | 2600 | 5200 | 6300 | 3600 | 6300 | 2300 |
| Bond strengths, after an exposure to 120°F, 100% relative humidity environment for: |  |  |  |  |  |  |  |  |
| 30 days | 1200 | 1300 | 1820 | 3200 | 3200 | 3800 | 1000 | 1700 |
| 60 days | 100 | 150 | 300 | 4000 | 3200 | 600 | 825 | 220 |

TABLE III

|  | 1 | 2 | 3 | 4 | 5 | 6 | 7 | 8 |
|---|---|---|---|---|---|---|---|---|
| Adhesive resin R-1 | 100 | 100 | 100 | 100 | 100 | 100 | 100 | 100 |
| Acrylic acid | — | — | 7 | — | 7 | — | 7 | — |
| gamma-Methacryloxypropyl trimethoxysilane | 3 | — | — | — | — | — | — | — |
| gamma-Aminopropyltriethoxy-silane | — | — | — | 3 | 3 | — | — | — |
| Phenyltrimethoxysilane | — | 3 | 3 | — | — | — | — | — |
| Cyanoethylmethoxydiethoxysilane | — | — | — | — | — | 3 | 3 | — |
| Methyl ester of methacrylic acid | — | — | — | — | — | — | — | 10 |
| 24-hour bond strengths, solvent wiped cold rolled steel | 3530 | 1850 | 3900 | 1700 | 4930 | 3310 | 4230 | 2400 |
| 100% relative humidity, 175 F, exposure for: |  |  |  |  |  |  |  |  |
| 10 days | 1660 | 1280 | 3480 | 1800 | 4200 | 1440 | 4910 | 720 |
| 30 days | 0* | 0* | 2550 | 0* | 2600 | 0* | 3050 | 0* |

0* = fell apart with no bond left.

TABLE IV

|  | U.S. 3,301,351, No. 4 |  |  |  |
|---|---|---|---|---|
|  | 1 | 2 | 3 | 4 |
| Adhesive resin R-2 | 100 | 97 | 95 | 92 |
| Methacrylic acid | — | 3 | — | 3 |
| gamma-Methacryloxypropyltri-methoxysilane | — | — | 5 | 5 |
| 24-hour strength, cold rolled steel | 2650 | 3200 | 2480 | 3750 |
| 30 days, 100% relative humidity 120°F. | 1600 | 1810 | 1420 | 3340 |

Bonding procedure for Tables II, III, and IV:
  The catalyzed adhesives were applied to cold rolled steel, using 0.5 inch overlap assembly with a 10 mil glue line thickness. The bonded assemblies were left undisturbed for 24 hours at 72°F. The assemblies were tested by shearing using an Instron testing machine with a cross head speed of 0.2 inch per minute. Strengths are reported in pounds per square inch.
Table I procedure:
  The same procedure was followed except aluminum lap shear assemblies were used.

What is claimed is:
1. An adhesive composition comprising a polymerizable mixture consisting essentially of:
  A. about 75 to about 99% of a polymerizable liquid resin comprising at least one compound having at least one terminal $>C=CH_2$ group;
  B. about 0.5 to about 15% of ethylenically unsaturated carboxylic acid; and
  C. about 0.5 to about 10% of an organosilicon compound represented by the formula $X_3Si(CH_2)_mY$ in which $m$ is an integer from 0 to 3, Y is an organofunctional group and X is a group selected from the group consisting of hydrolyzable groups and hydrolyzed groups.

2. A composition of claim 1 in which component (A) contains methyl methacrylate.

3. A composition of claim 1 in which component (A) contains styrene.

4. A composition of claim 1 in which component (A) comprises a polymer of said compound containing at least one terminal $>C=CH_2$ group.

5. A composition of claim 4 in which said polymer is a copolymer of at least two compounds containing a terminal $>C=CH_2$ group.

6. A composition of claim 1 in which component (B) is acrylic acid.

7. A composition of claim 1 in which component (B) is methacrylic acid.

8. A composition of claim 1 in which component (B) comprises a mixture of ethylenically unsaturated carboxylic acids.

9. A composition of claim 1 in which the organofunctional group Y of component (C) includes a chemically reactive group.

10. A composition of claim 9 in which the chemically reactive group Y is selected from the group consisting of amino, cyano, glycidyl and terminal $>C=CH_2$.

* * * * *